United States Patent
Neufeld

(10) Patent No.: US 12,163,483 B2
(45) Date of Patent: Dec. 10, 2024

(54) METHOD FOR DETERMINING A CHARACTERISTIC VARIABLE OF A SOLENOID VALVE AND METHOD FOR TRAINING A PATTERN RECOGNITION METHOD BASED ON ARTIFICIAL INTELLIGENCE

(71) Applicant: Robert Bosch GmbH, Stuttgart (DE)

(72) Inventor: Marc Neufeld, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 198 days.

(21) Appl. No.: 17/942,959

(22) Filed: Sep. 12, 2022

(65) Prior Publication Data
US 2023/0100963 A1  Mar. 30, 2023

(30) Foreign Application Priority Data
Sep. 17, 2021 (DE) ...................... 10 2021 210 321.9

(51) Int. Cl.
*F02D 41/14* (2006.01)
*F02D 41/20* (2006.01)
(Continued)

(52) U.S. Cl.
CPC ......... *F02D 41/1405* (2013.01); *F02D 41/20* (2013.01); *F02D 41/221* (2013.01); *F02D 41/2467* (2013.01); *G06N 3/09* (2023.01); F02D 2041/2055 (2013.01); F02D 2041/2058 (2013.01); F02D 2041/224 (2013.01); Y02A 50/20 (2018.01); Y02T 10/12 (2013.01)

(58) Field of Classification Search
CPC .... F02D 41/1405; F02D 41/20; F02D 41/221; F02D 41/2467; F02D 2041/2055; F02D 2041/2058; F02D 2041/224; G06N 3/09
See application file for complete search history.

(56) References Cited

U.S. PATENT DOCUMENTS 5,650,909 A * 7/1997 Remele ................... F02D 41/20
361/170
6,311,674 B1 * 11/2001 Igashira ................ F02D 41/408
123/496
(Continued)

FOREIGN PATENT DOCUMENTS

DE 102010041320 A1 3/2012
DE 102011083481 A1 12/2012
(Continued)

*Primary Examiner* — Phutthiwat Wongwian
*Assistant Examiner* — Susan E Scharpf
(74) *Attorney, Agent, or Firm* — NORTON ROSE FULBRIGHT US LLP; Gerard A. Messina

(57) ABSTRACT

A method for determining a characteristic variable for opening and/or closing a flow-through opening of a solenoid valve, in which solenoid valve a solenoid coil is energized to raise an armature to open the flow-through opening for a fluid. During operation of the solenoid valve, a profile of a current in the solenoid coil being determined, and using a pattern recognition method based on artificial intelligence, the characteristic variable(s) is/are determined based on at least one section of the profile or a profile derived therefrom using a neural network. A method for applying and for training a pattern recognition method based on artificial intelligence are also described.

13 Claims, 3 Drawing Sheets

(51) Int. Cl.
  *F02D 41/22*  (2006.01)
  *F02D 41/24*  (2006.01)
  *G06N 3/09*  (2023.01)

(56)  References Cited

U.S. PATENT DOCUMENTS

| | | | | |
|---|---|---|---|---|
| 9,127,612 | B2* | 9/2015 | Nakata | F02D 41/2461 |
| 11,506,165 | B2* | 11/2022 | Bollinger | F02D 41/247 |
| 2012/0158268 | A1* | 6/2012 | Nakata | F02D 41/2467 |
| | | | | 701/103 |
| 2019/0093594 | A1* | 3/2019 | Reiling | F02D 41/008 |
| 2021/0372342 | A1* | 12/2021 | Schmitt | F02D 41/3809 |
| 2022/0145840 | A1* | 5/2022 | Bollinger | G05B 13/027 |

FOREIGN PATENT DOCUMENTS

| | | |
|---|---|---|
| DE | 102017200202 A1 | 7/2018 |
| DE | 102017219571 A1 | 5/2019 |
| DE | 102018203215 A1 | 9/2019 |
| DE | 102019131406 A1 | 5/2021 |
| DE | 102020208056 B3 | 6/2021 |

* cited by examiner

METHOD FOR DETERMINING A CHARACTERISTIC VARIABLE OF A SOLENOID VALVE AND METHOD FOR TRAINING A PATTERN RECOGNITION METHOD BASED ON ARTIFICIAL INTELLIGENCE

FIELD

The present invention relates to a method for determining a characteristic variable for opening and/or closing of a flow-through opening of a solenoid valve, a method for training a pattern recognition method based on artificial intelligence, which is used to determine such a characteristic variable, and a processing unit and a computer program for carrying out the methods.

BACKGROUND INFORMATION

Solenoid valves include a solenoid coil and an armature, which is raised or pulled by energizing the coil—for this purpose a specific voltage or a mean voltage is applied via a pulse width-modulated activation—and thus unblocks a flow-through opening. Typical uses of solenoid valves are accurate metering of liquid or gaseous fuels (e.g., fuel injectors, metering valves for fuels, control valves of hydraulic machines). The solenoid valve is typically used therein to unblock (or open) or close a flow-through opening for the fuel accurately defined with respect to time.

SUMMARY

According to the present invention, a method for determining a characteristic variable for opening and/or closing a flow-through opening of a solenoid valve, a method for training a pattern recognition method based on artificial intelligence, and a processing unit and a computer program for carrying out the methods are provided. Advantageous embodiments of the present invention are disclosed herein.

The present invention relates to solenoid valves including a solenoid coil and an armature; in such a solenoid valve, the solenoid coil is typically energized by applying a voltage or an activation voltage defined with respect to time, in order to raise the armature. A flow-through opening of the solenoid valve for a fluid (in particular a liquid or a gas) is thus opened or unblocked. When the energization is ended, the armature falls back again—or is pressed back, in particular by a spring—possibly with a time delay and closes or seals the flow-through opening again. It is also possible to refer very generally to opening and closing of the solenoid valve here.

Such solenoid valves may be used for various applications, for example, in a vehicle. They may be provided there in particular for introducing fuel as a fluid into cylinders of an internal combustion engine, or also for introducing reducing agents or reducing agent solutions as a fluid into an exhaust tract (for example, upon use of a so-called SCR system for "Selective Catalytic Reduction," i.e., for reducing pollutant emissions). Other fluids, also independently of vehicles, may also be deliberately introduced into volumes or spaces with the aid of such solenoid valves. Further examples are mentioned at the outset.

Not only, but in particular upon use in vehicles, accurate knowledge of the point in time at which the solenoid valve opens and/or closes is important so that a determinable amount of the operating means (fluid) may be introduced via the valve into the target volume. A minimum requirement for operating a valve is thus the knowledge about whether the solenoid valve opens or closes at all.

The recognition of whether and at which point in time a solenoid valve used as an injection valve opens and closes is of decisive importance, for example, for the determination of the injected amount of fluid (e.g., diesel, gasoline, reducing agent, hydraulic oil, compressed air). For this purpose, for example, typically expensive needle movement sensors or evaluations of the activation profile of the electrically activated valves may be used. In the case of a solenoid valve, the current profile during the energization or activation of the solenoid coil may be used for this purpose, which pulls the armature and thus, for example, also the (valve) needle out of the valve seat by a generated magnetic field during the operation of the solenoid valve, thus, for example, the injection, and thus enables the injection, i.e., unblocks the flow-through opening. A typical current profile including attraction and holding phase and closing of the valve is shown in the figures.

Due to the mechanical movement of the armature or the needle and possibly further parts in the solenoid valve, a counter induction characteristic for the opening and closing movement is triggered, which may be analyzed by a current measurement having high resolution with respect to time. The so-called "Begin/End of Injection Pulse" methods (BIP/EIP) are particularly preferably used for this purpose, which determine via the analysis of the curvature change (this corresponds to the second time derivative) of the current profile, thus the measured current profile, at which points in time the opening or closing of the solenoid valve takes place with given activation. This is because the beginning and the end of the movement of the needle or the armature cause a measurable change of the curvature in the current profile.

Absence or drifting (deviation) of characteristic features BIP or EIP may then be used, for example, for diagnostic purposes and generally indicate a defect or increasing wear of the solenoid valve. Due to the knowledge of the real, measured opening time (i.e., the period of time between opening and closing) of the solenoid valve, the real injected amount of fluid may be calculated and corrected, for example, in a closed control loop upon the next injection in relation to the requested amount of fluid to be injected. In general, operation of the solenoid valve may thus be carried out and/or adapted on the basis of such characteristic variables for the opening and/or closing. A diagnosis or, if indicated, an emergency measure for averting danger or damage due to the improperly functioning valve is also possible.

As mentioned, in particular the second time derivative of the current profile or the current signal may be used for ascertaining the curvature change. While the curvature change at least in theory permits a very accurate determination of the relevant point in time, this procedure is very susceptible to interference in practice; this is because it reacts sensitively to noise in the measuring signal. In the case of a clocked activation, for example, a solenoid valve designed for an activation voltage of 12 V may be used in a system including a 24 V operating voltage; the current profile of the activated solenoid valve then has a strong waviness here, which makes the evaluation via the (second) time derivative much more difficult. For example, complex filtering of the signal is necessary to avoid or minimize misdetections.

According to an example embodiment of the present invention, it has now been shown that a range characterizing the opening or closing, for example, an inflection, may be recognized with sufficient accuracy by the use of a (machine) pattern recognition method based on artificial intelligence, for example, in particular an artificial neural network (this is often also referred to only as a neural network) or a "Support Vector Machine" (SVM), even with possibly noisy signal of the current profile. It is thus provided that a profile of a current (current profile) in the solenoid coil be determined or detected during operation of the solenoid valve, and at least one characteristic variable for opening and/or closing of the flow-through opening of the solenoid valve be determined using the pattern recognition method based on artificial intelligence on the basis of at least one section of the profile (possibly also the entire profile, however).

In particular, for this purpose, for example, according to an example embodiment of the present invention, initially the current profile is detected; this may be detected, for example, by a back measurement of the activation signal running during the activation (current or voltage; a voltage signal may stand for the current profile) in an executing processing unit, for example, a control unit or a microcontroller therein. In a solenoid valve, the measurement of the activation current, for example, via a current shunt (measuring resistor) located after an end stage is typical. The voltage signal of the current shunt is then converted, for example, in an analog-to-digital converter of the microcontroller into measured values processable by software. These measured values are typically ascertained in an equidistant time grid, however, an arbitrary chronological pattern for recording the data, which may be redefined from measurement to measurement, is also possible. These measured values (it is thus a measurement series) and possibly information about the points in time of the measurement may then be supplied as the input or input value(s) (so-called input vector) to the pattern recognition method, thus, for example, fed in at receptors of a neural network. If the pattern recognition method is trained, i.e., taught accordingly, it supplies a corresponding output vector or one or multiple output values based on the input vector, in the present case a characteristic variable for the opening and/or closing of the flow-through opening of the solenoid valve. Reference is also made to the following statements with respect to the training of pattern recognition methods or an artificial neural network.

According to an example embodiment of the present invention, the characteristic variable is preferably selected from an opening point in time of the flow-through opening, a closing point in time of the flow-through opening, a value which indicates whether the flow-through opening has been opened or closed or not (in terms of a classification), and a value which indicates with which probability the flow-through opening has been opened or closed (for example, a value may be indicated here in percent or in ranges, for example, "certainly open," "very probably open," etc.; this also represents a classification). Which of these variables is or are selected as the output may be selected, for example, depending on the desired application; however, the pattern recognition method is then selected accordingly for the desired characteristic variable. In addition, it is to be considered here that the section of the current profile has to be selected accordingly, i.e., when the point in time of the opening is to be determined, the section which is supplied to the pattern recognition method also has to include the relevant point in time. Several of these characteristic variables may also be output if the pattern recognition method is selected and trained accordingly.

Due to the use of a pattern recognition method based on artificial intelligence, even with (very) noisy signal of the current profile, very good pieces of relevant information about the operation of the solenoid valve may thus be obtained. Additional filtering or even an additional sensor is not necessary. In particular, the characteristic variable may be determined directly from the profile of the current here, a (time) derivative is not necessary; nonetheless, instead of the profile itself, a derivative thereof may also be used.

Various types of pattern recognition methods based on artificial intelligence come into consideration, e.g., single-layer or multilayered "feedforward" networks (also referred to as single-layer or multilayered perceptrons), or also so-called recurrent networks. Depending on demand and desired accuracy and/or speed in the calculation, a suitable network may be selected.

According to an example embodiment of the present invention, a pattern recognition method based on artificial intelligence which is trained or taught before its use is particularly advantageous. A method for training a pattern recognition method which is used for determining a characteristic variable for opening and/or closing of a flow-through opening of a solenoid valve-thus the intended use explained above—is also the subject matter of the present invention.

For this purpose, for multiple profiles or multiple variations of the profiles, for example, under different boundary conditions (temperatures, various valve specimens including, for example, center/edge locations of the spring strength/spray hole discs, voltage profiles, and the like) of a current profile occurring in the solenoid coil during operation of the solenoid valve, at least one section of each of them is supplied to the pattern recognition method as an input value. The sections used are to correspond to those sections as will also occur later during use of the pattern recognition method. These sections or the underlying current profiles may originate, for example, from test measurements or the like; however, simulations or simulated current profiles would also be fundamentally possible here.

According to an example embodiment of the present invention, on the basis of characteristic variables obtained for these sections from the pattern recognition method based on artificial intelligence as starting value(s) and comparison values thereto, the machine pattern recognition method, for example, weights of an artificial neural network, is then adapted. In other words, for many different sections of current profiles, as occur during operation of the solenoid valve, of which the associated characteristic variables are known (these are the comparison values mentioned), these are supplied to the pattern recognition method. The pattern recognition method then outputs a characteristic variable for each section which—in any case at the beginning of the training—usually does not correspond or rarely corresponds to the actual characteristic variable, the comparison value. The pattern recognition method based on artificial intelligence is therefore adapted, so that in following calculations the output characteristic variable is better or more accurate. This procedure may be repeated for many different known sections of current profiles, until the pattern recognition method is sufficiently accurately trained, i.e., until its starting values satisfactorily reflect the values known in training and thus are expected.

Various types of training or learning come into consideration. In supervised learning, for example, an input pattern (the known sections of the current profile here) is given to the pattern recognition method based on artificial intelligence and the output or the output values which the pattern recognition method produces in its present state are compared to the value which it should actually output. The changes to be performed in the configuration may be inferred by comparing setpoint output and actual output. In neural networks including single layer perceptrons, the so-called delta rule (also perceptron learning rule) may be used. Multilayered perceptrons are generally trained using back propagation, which represents a generalization of the delta rule.

According to an example embodiment of the present invention, unsupervised learning is carried out exclusively by input of the patterns to be learned. The pattern recognition method based on artificial intelligence changes in accordance with the input patterns on its own. Moreover, there is so-called reinforced learning; this may be used if the matching output data set (comparison values) is not available for training for each input data set.

According to an example embodiment of the present invention, multiple profiles of the current (from which the sections are selected; in principle, of course, the complete current profiles may also be used) are particularly preferably selected for various values of parameters of the solenoid valve. For example, activation voltages for the solenoid coil, spring strengths of springs which press against the armature, dimensions (for example, diameter) of the flow-through opening, temperatures of the fluid and the solenoid valve, runtimes and wear of the solenoid valve, a number of opening/closing cycles which have already taken place, and a functionality of the solenoid valve (for example, a current profile for a possibly intentionally blocked solenoid valve) come into consideration as parameters. In that current profiles for various values of parameters are used for training, the pattern recognition method based on artificial intelligence may in particular also recognize the trained different situations later during its use, thus, for example, whether a current profile means that the solenoid valve is blocked and therefore has not opened. The real physical point in time of the opening/closing may also nonetheless always be found or a blockage of the valve may be recognized, for example, for various operating conditions and thus various resulting current profiles. The multiple profiles of the current profile may be selected in particular for various values of parameters of the solenoid valve from input vectors, which are provided via a remote processing and/or storage system, for example, a so-called cloud.

A processing unit according to the present invention, for example, a control unit of a motor vehicle or a machine or also a PC (for the training) is configured, in particular by programming, to carry out the method(s) according to the present invention.

The implementation of a method according to the present invention in the form of a computer program or computer program product including program code for carrying out all method steps is also advantageous, since this causes particularly low costs, in particular if an executing control unit is also used for further tasks and is therefore provided in any case, for example, for the activation of the valve. Finally, a machine-readable memory medium is provided including a computer program as described above stored thereon. Suitable memory media or data media for providing the computer program are in particular magnetic, optical, and electrical memories, for example, hard drives, flash memories, EEPROMs, DVDs, etc. A download of a program via computer networks (Internet, intranet, etc.) is also possible. Such a download may take place in a hardwired or wireless manner (e.g., via a WLAN network, a 3G, 4G, 5G, or 6G connection, etc.).

Furthermore, according to an example embodiment of the present invention, an implementation is possible in which the detection of the input vector (values and timestamps of the current profile) is carried out on location in the mobile control unit (motor vehicle, machine) and subsequently transferred to a neural network in the cloud to ascertain the output vector (upload). In this case, the control unit receives the output vector of the neural network as a response to the request (download). Such an upload/download may take place in a hardwired or wireless manner (e.g., via a WLAN network, a 3G, 4G, 5G, or 6G connection, etc.). Neural networks for evaluating the output vector in the cloud are particularly advantageous, because here simple supervised learning may also be continued by further adaptation of the neural network even during the running operation by an observer (operator/supervisor) and a permanent optimization of the parameters is enabled due to the variety of data from various specimens operated under real operating conditions.

Further advantages and embodiments of the present invention result from the description herein and the figures.

The present invention is schematically shown on the basis of an exemplary embodiment in the figures and is described hereinafter with reference to the figures.

DETAILED DESCRIPTION OF EXAMPLE EMBODIMENTS

Figure 1:
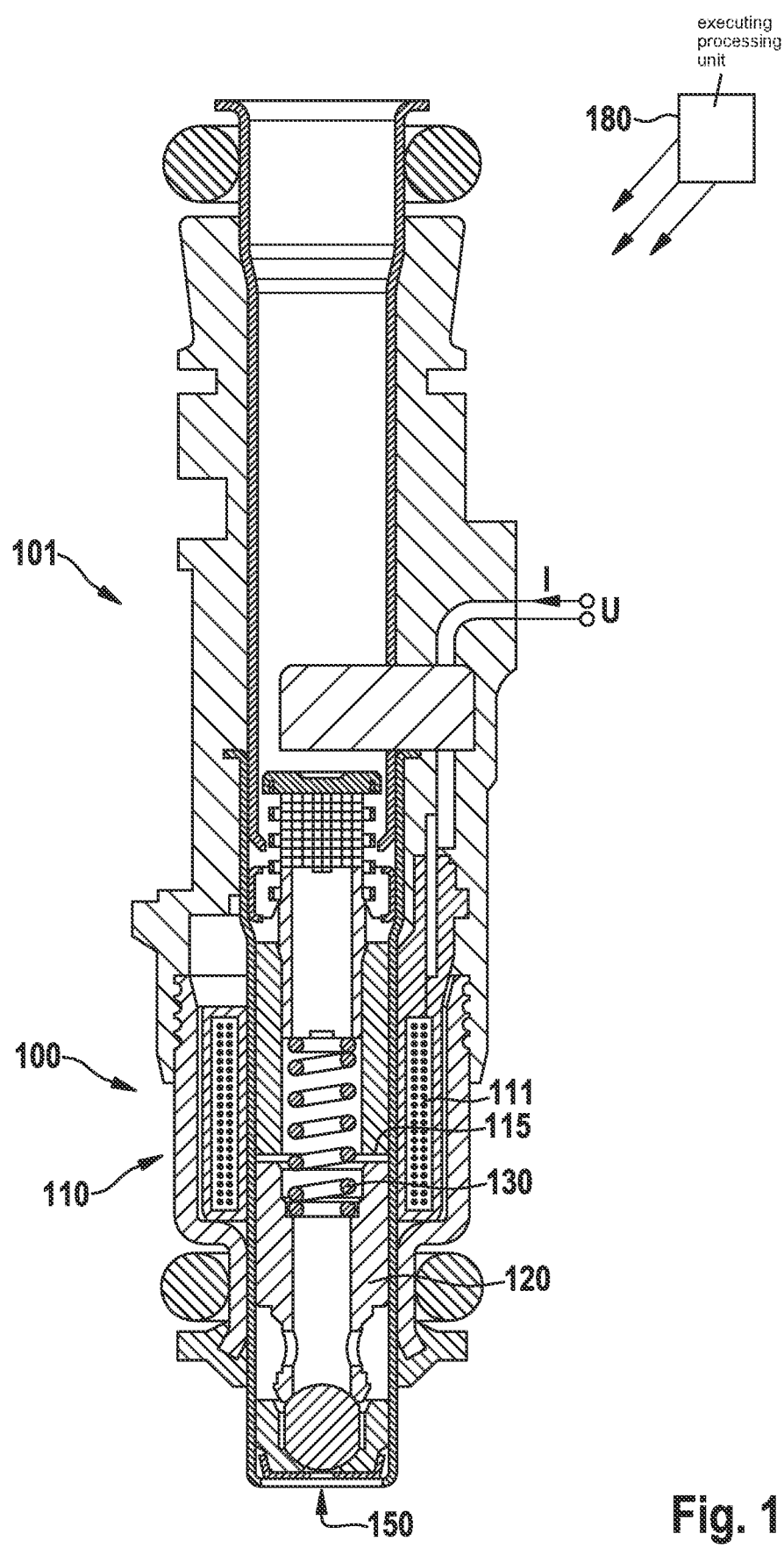
FIG. 1 schematically shows a solenoid valve in which a method according to the present invention.

FIG. 1 schematically shows a solenoid valve 100, which is used by way of example in a fuel injector 101 and in which a method according to the present invention may be carried out. Solenoid valve 100 includes an electromagnet 110 including a solenoid coil 111, which may be designed to be annular, for example. Upon application of an (activation) voltage U, for example by an executing processing unit 180 designed as a control unit, current I flows in solenoid coil 111.

Furthermore, an armature 120 is provided, which is moreover used as a valve needle, using which a flow-through opening 150 may be closed or unblocked (opened). Furthermore, a spring 130 is provided, which engages on the armature 120 and, without energization of solenoid coil 111 and thus without magnetic force, presses armature 120 into or against flow-through opening 150 and closes it. Spring 130 may be in contact on its side facing away from the armature on a suitable component of solenoid valve 100.

Upon energization of solenoid coil 111, a magnetic force is built up and armature 120 is raised against the spring force of spring 130 and pulled in the direction of solenoid coil 111 or electromagnet 110. Flow-through opening 150 is unblocked. Upon corresponding energization of the solenoid coil, armature 120 may be raised up to stop 115.

Figure 2:
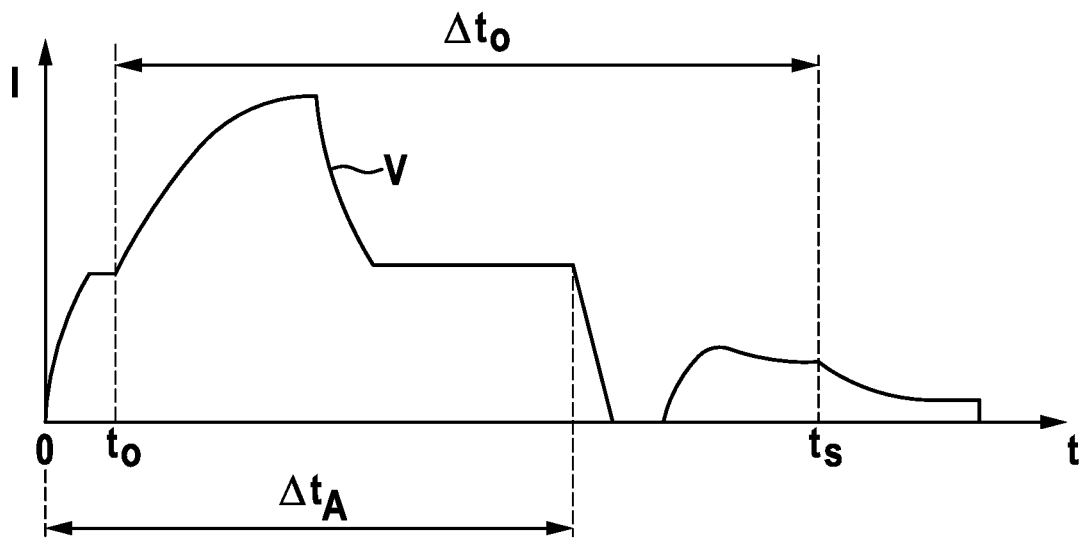
FIG. 2 shows a schematic profile of a current in the solenoid coil of a solenoid valve for explaining a method according to the present invention in one preferred specific embodiment.

FIG. 2 shows a schematic signal profile V of a current I over time t in the solenoid coil of a solenoid valve for explaining a method according to the present invention in one preferred specific embodiment.

At point in time t=0, the activation begins by applying an activation voltage to the solenoid coil, the current increases (attraction phase). At time to, an inflection is apparent in current profile V; this is the opening point in time of the solenoid valve corresponding to the mentioned "Begin of Injection Pulse" method (BIP). This inflection results due to the movement of the armature (or the valve needle), which is raised by the solenoid coil at sufficiently high magnetic force.

The current then increases further up to a maximum; from then, a change typically takes place from the attraction phase into a holding phase having lower current, until the energization is ended after passage of the activation period of time $\Delta t_A$. This may take place due to removal of the voltage or also due to application of an extinction voltage. The armature then falls back and closes the flow-through opening again at point in time $t_s$. This is the closing point in time of the solenoid valve corresponding to the mentioned "End of Injection Pulse" method (EIP). Total opening time $\Delta t_o$ results from the difference of closing and opening points in time and may be used, for example, for determining the amount of fluid injected here.

Figure 3:
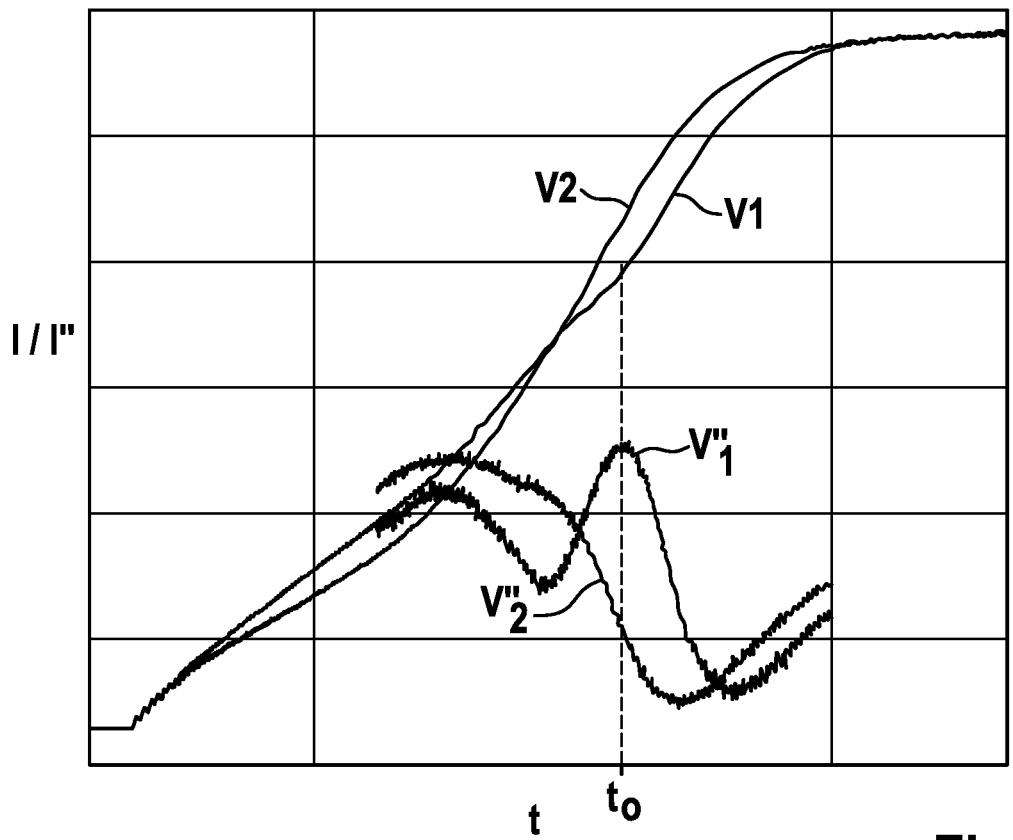
FIG. 3 shows profiles of a current in the solenoid coil of a functional solenoid valve and a blocked solenoid valve in the attraction phase and associated time derivatives for explaining a method according to the present invention in one preferred specific embodiment.

FIG. 3 shows various profiles of a current I in the solenoid coil of a solenoid valve and associated second time derivatives I" over time t (thus $d^2I/dt^2$) for explaining a method according to the present invention in one preferred specific embodiment; in particular, only sections of the profiles which include the opening point in time are shown here.

Profile $V_1$ corresponds here to a current profile as may occur in a properly functioning solenoid valve; in particular, the profile is comparable to profile V from FIG. 2 or the corresponding section thereof. Due to the high activation voltage used here, the inflection at opening point in time to is less strongly pronounced than in the schematic representation from FIG. 2.

Profile $V''_1$ corresponds to the second time derivative of profile $V_1$ and thus indicates curvature changes. In this case, a maximum is apparent clearly at opening point in time to. The conventional detection methods use, for example, a pronounced maximum which is located after a minimum as a feature for the opening point in time of the valve. Profile $V''_1$ shown here, however, is filtered; otherwise, the maximum would be more difficult to determine or it could be determined less accurately.

Profile $V_2$ corresponds to a current profile as may occur in a solenoid valve which is blocked or not functioning properly; there is accordingly no inflection for an opening point in time here. Profile $V''_2$ corresponds to the second time derivative of profile $V_2$ and thus indicates curvature changes. Accordingly, a sharp maximum which follows a minimum for an opening point in time is not to be ascertained here; however, under certain circumstances conventional evaluation methods may misinterpret the profile before the chronologically expected opening point in time as a less pronounced minimum-maximum and incorrectly report back an opening point in time.

As mentioned, however, within the scope of the present invention, the current profiles are in particular used directly, thus without derivative, thus, for example, profile $V_1$ or $V_2$, in order to determine a characteristic variable for the opening and/or closing of the flow-through opening of the solenoid valve.

Figure 4:
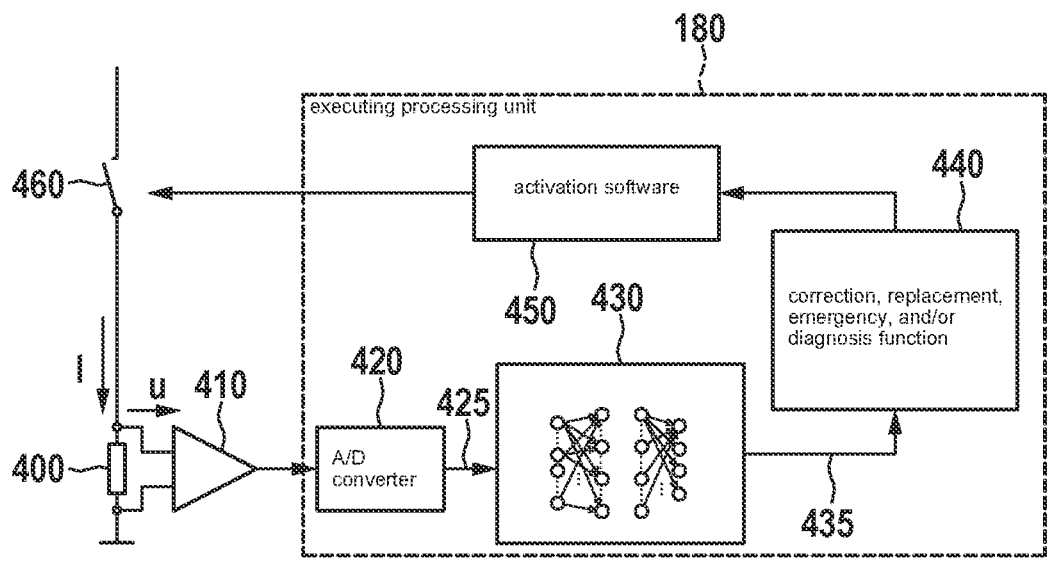
FIG. 4 shows a sequence of a method according to the present invention in one preferred specific embodiment on the basis of a circuit.

FIG. 4 shows a sequence of a method according to the present invention in one preferred specific embodiment on the basis of a circuit. Current I flowing during the energization of the solenoid coil is detected in that measuring voltage u dropping across a measuring shunt 400 is detected and amplified, for example, with the aid of an amplifier 410. This measuring voltage or its profile thus corresponds to the current profile in the solenoid coil as indicated, for example, in FIG. 2 with V or in FIG. 3 with $V_1$ or $V_2$. In executing processing unit 180, the measuring voltage may be converted, for example, via an analog-to-digital converter 420 into measured values processable by software. These measured values and possibly information about the point in time of the measurement are then fed in as input values 425 to the receptors of a (previously trained) artificial network as a pattern recognition method 430 used here.

Artificial neural network 430 then outputs as output value(s) 435 at least one characteristic variable, for example, opening point in time to or closing point in time $t_s$ or both. The characteristic variable may also include a value which indicates whether or not the solenoid valve has opened (yes/no); in the case of profile $V_2$ of FIG. 3, the solenoid valve would not have opened, for example, 0 (digital for "not open") could be output as the value.

The characteristic variable (or several of them) may then be transferred, for example, to a correction, replacement, emergency, and/or diagnosis function 440, with the aid of which, for example, activation times or activation voltages for the solenoid coil may be corrected in the next activation cycle or an auxiliary injection. These may then be implemented in activation software 450 to activate the solenoid coil, for example, by applying a specific activation voltage; this is illustrated as an example by a switch 460.

Figure 5:
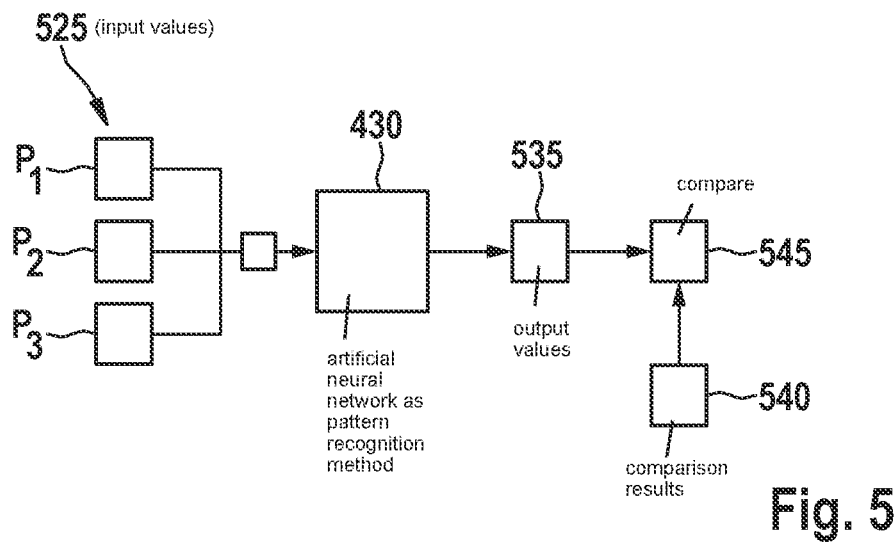
FIG. 5 shows a sequence of a method according to the present invention in another preferred specific embodiment.

FIG. 5 schematically shows a sequence of a method according to the present invention in another preferred specific embodiment, specifically for training the pattern recognition method, for example, artificial neural network 430. For this purpose, multiple different current profiles are supplied as input values 525 to neural network 430, which generates one or multiple output values 535 in each case. The neural network or its weights may then be adapted, for example, in a step 545 by a comparison to comparison values 540.

As already mentioned, it is advantageous if multiple profiles of the current profile are selected for various values of parameters of the solenoid valve; three parameters $P_1$, $P_2$, and $P_3$ are shown as examples, which may stand, for example, for activation voltages for the solenoid coil, spring strengths of springs which press against the armature, and dimensions of the flow-through opening.

In the case of a neural network in the cloud, the input vectors used may be used as parameters $P_1$, $P_2$, $P_3$ or other parameters for the permanent training thereof.

The pattern recognition method trained or taught in this way may then be used as explained with reference to FIG. 4, for example, to determine opening and closing points in time of a solenoid valve.

The invention claimed is:

1. A method for determining a characteristic variable for opening and/or closing a flow-through opening of a solenoid valve, the solenoid valve including a solenoid coil which is energized to raise an armature for opening the flow-through opening for a fluid, the method comprising the following steps:

determining, during operation of the solenoid valve, a profile of a current in the solenoid coil;

determining a characteristic variable using a pattern recognition method based on artificial intelligence, based on at least one section of the profile or on a section of a profile derived from the profile; and carrying out and/or adapting an operation of the of the solenoid valve based on the determined characteristic variable.

2. The method as recited in claim 1, wherein the characteristic variable is selected from: an opening point in time of the flow-through opening, a closing point in time of the flow-through opening, a value which indicates whether the flow-through opening has been opened or closed or not, and a value which indicates the probability with which the flow-through opening has been opened or closed.

3. The method as recited in claim 1, wherein a diagnosis is carried out, based on the determined characteristic variable.

4. The method as recited in claim 1, wherein the solenoid valve is used for introducing fuel into cylinders of an internal combustion engine or reducing agent or reducing agent solution into an exhaust tract of an internal combustion engine.

5. The method as recited in claim 1, wherein the solenoid valve is configured for metering or measuring the fluid into a volume.

6. The method as recited in claim 5, wherein the fluid is a liquid or a gas.

7. A method for training a pattern recognition method based on artificial intelligence, which is used for determining a characteristic variable for opening and/or closing of a flow-through opening of a solenoid valve, the solenoid valve including a solenoid coil which is energized to raise an armature for opening the flow-through opening for a fluid, the method comprising:

for each of multiple profiles of a current profile occurring during operation of the solenoid valve in the solenoid coil or a profile derived from the current profile, supplying at least one section as an input value to the pattern recognition method based on artificial intelligence;

based on characteristic variables obtained for the sections from the pattern recognition method based on artificial intelligence as an output value and comparison values thereto, adapting the pattern recognition method based on artificial intelligence;

determining, using the adapted pattern recognition method, the characteristic variable for opening and/or closing the flow-through opening of the solenoid value; and carrying out and/or adapting an operation of the of the solenoid valve based on the determined characteristic variable.

8. The method as recited in claim 7, wherein the multiple profiles of the current profile are selected for various values of parameters of the solenoid valve.

9. The method as recited in claim 7, wherein the multiple profiles of the current profile are selected for various values of parameters of the solenoid valve from input vectors which are provided via a remote processing and/or memory system.

10. The method as recited in claim 8, wherein the parameters of the solenoid valve are selected from: operating temperatures of the fluid and the solenoid valve, runtimes and wear of the solenoid valve, a number of opening/closing cycles which have already taken place, activation voltages for the solenoid coil, spring strengths of springs which press against the armature, dimensions of the flow-through opening, a functionality of the solenoid valve.

11. The method as recited in claim 7, wherein the pattern recognition method based on artificial intelligence uses an artificial neural network or a support vector machine.

12. A processing unit configured to determine a characteristic variable for opening and/or closing a flow-through opening of a solenoid valve, the solenoid valve including a solenoid coil which is energized to raise an armature for opening the flow-through opening for a fluid, the processing unit configured to:

determine, during operation of the solenoid valve, a profile of a current in the solenoid coil;

determine a characteristic variable using a pattern recognition method based on artificial intelligence, based on at least one section of the profile or on a section of a profile derived from the profile; and carry out and/or adapt an operation of the of the solenoid valve based on the determined characteristic variable.

13. A non-transitory machine-readable memory medium on which is stored a computer program for determining a characteristic variable for opening and/or closing a flow-through opening of a solenoid valve, the solenoid valve including a solenoid coil which is energized to raise an armature for opening the flow-through opening for a fluid, the computer program, when executed by a processing unit, causing the processing unit to perform the following steps:

determining, during operation of the solenoid valve, a profile of a current in the solenoid coil;

determining a characteristic variable using a pattern recognition method based on artificial intelligence, based on at least one section of the profile or on a section of a profile derived from the profile; and carrying out and/or adapting an operation of the of the solenoid valve based on the determined characteristic variable.

* * * * *